(12) United States Patent
Kim et al.

(10) Patent No.: US 8,721,499 B2
(45) Date of Patent: May 13, 2014

(54) METHOD OF CONTROLLING CLUTCH OF VEHICLE

(71) Applicant: Hyundai Motor Company, Seoul (KR)

(72) Inventors: Joung Chul Kim, Suwon-si (KR); Young Min Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/689,082

(22) Filed: Nov. 29, 2012

(65) Prior Publication Data

US 2014/0087918 A1    Mar. 27, 2014

(30) Foreign Application Priority Data

Sep. 25, 2012  (KR) ........................ 10-2012-0106516

(51) Int. Cl.
*B60W 10/02*     (2006.01)

(52) U.S. Cl.
USPC .......................................... 477/180; 477/175

(58) Field of Classification Search
None
See application file for complete search history.

(56) References Cited

U.S. PATENT DOCUMENTS

| | | | | |
|---|---|---|---|---|
| 5,529,548 A | * | 6/1996 | Mack | 477/84 |
| 5,681,242 A | * | 10/1997 | Bates | 477/180 |
| 5,738,609 A | * | 4/1998 | Jones et al. | 477/175 |
| 6,656,090 B2 | * | 12/2003 | Matsumura et al. | 477/171 |
| 2006/0161325 A1 | * | 7/2006 | Jiang | 701/54 |
| 2011/0288735 A1 | * | 11/2011 | Shelton et al. | 701/68 |

FOREIGN PATENT DOCUMENTS

| | | |
|---|---|---|
| JP | 2002-31159 A | 1/2002 |
| KR | 10-2011-0107066 A | 9/2011 |

* cited by examiner

*Primary Examiner* — David D Le
*Assistant Examiner* — Steven B Christ
(74) *Attorney, Agent, or Firm* — Morgan, Lewis & Bockius LLP

(57) ABSTRACT

A method controls a clutch for vehicles. In a vehicle provided with a transmission such as a DCT or AMT which uses a dry clutch as a launch clutch, the clutch is controlled such that clutch control torque can smoothly vary when a driver manipulates an accelerator pedal during creep driving under a control logic so that the controlling of the clutch is converted into launch control, thus preventing the vehicle from jerking and improving the ride comfort of the vehicle, thereby enhancing the merchantability of the vehicle.

2 Claims, 4 Drawing Sheets

US 8,721,499 B2

METHOD OF CONTROLLING CLUTCH OF VEHICLE

CROSS-REFERENCE TO RELATED APPLICATION

The present application claims priority of Korean Patent Application Number 10-2012-0106516 filed Sep. 25, 2012, the entire contents of which application is incorporated herein for all purposes by this reference.

BACKGROUND OF INVENTION

1. Field of Invention

The present invention relates generally to methods of controlling clutches of vehicles and, more particularly, to a method of controlling a clutch in the launch conditions of an AMT or DCT vehicle generated when a driver manipulates an accelerator pedal during creep driving.

2. Description of Related Art

In conventional Automated Manual Transmissions (AMTs), Dual Clutch Transmissions (DCTs), etc. which use dry clutches, creep driving, which is generated in an existing automatic-transmission vehicle provided with a torque converter, is created by controlling a clutch. The clutch is controlled such that even when a driver does not step on an accelerator pedal, the vehicle moves slowly.

When a driver steps on an accelerator pedal during the creep driving, the driving of the vehicle is controlled depending on the extent to which the accelerator pedal is pushed. The control operation conducted at this time refers to launch control.

FIG. 1 is a flowchart of a conventional method of controlling the torque of a clutch when the control of a vehicle is converted into the launch control during the creep driving. FIG. 2 is a graph of variations in a clutch control torque, the RPM of an engine, and the RPM of an input shaft of a transmission in the conventional control method.

Referring to FIG. 1, a controller calculates a creep torque which is a clutch control torque during creep control and controls a clutch depending on the creep torque. When the vehicle is in a creep driving state, if a driver manipulates an accelerator pedal so that an APS is actuated and launch control is required, the controller calculates both a creep torque which is a clutch control torque during the creep driving and a launch torque which is a clutch control torque required for the launch control resulting from the manipulating of the accelerator pedal, and then selects a higher value of them as the clutch control torque to control the clutch.

According to the above-mentioned conventional control method, when the driver manipulates the accelerator pedal during the creep control, the creep control is converted into launch control. At this time, the clutch control torque is rapidly increased to a degree that is much higher than the clutch control torque in the creep driving. As shown in FIG. 2, this causes rotational vibration of the input shaft of the transmission, thus resulting in jerking of the vehicle.

The jerking of the vehicle, which is caused when the accelerator pedal is pushed during the creep driving, causes a rough ride of the vehicle, thus deteriorating the merchantability of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art.

Various aspects of the present invention provide for a method of controlling a clutch of a vehicle provided with a transmission such as a DCT or AMT which uses a dry clutch as a launch clutch, such that clutch control torque can smoothly vary when a driver manipulates an accelerator pedal during creep driving under a control logic so that the controlling the clutch is converted into launch control, thus preventing the vehicle from jerking and improving the ride comfort of the vehicle, thereby enhancing the merchantability of the vehicle.

Various aspects of the present invention provide for a method of controlling a clutch of a vehicle, including: an accelerator-pedal-manipulation determining operation of determining whether an accelerator pedal has been manipulated during creep control; and a connection control operation of controlling a clutch control torque actually applied to the clutch such that if, from a result of the accelerator-pedal-manipulation determining operation, it is determined that the accelerator pedal has been manipulated during the creep control, when a launch torque, which is a clutch control torque calculated depending on a rate to which the accelerator pedal is manipulated, becomes greater than a creep torque which is a clutch control torque during the creep control, the clutch control torque gradually and continuously increases from the creep torque to the launch torque.

According to various aspects of the present invention, in a vehicle provided with a transmission such as a DCT or AMT which uses a dry clutch as a launch clutch, the clutch is controlled such that clutch control torque can smoothly vary when a driver manipulates an accelerator pedal during creep driving under a control logic so that the controlling the clutch is converted into launch control, thus preventing the vehicle from jerking and improving the ride comfort of the vehicle, thereby enhancing the merchantability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
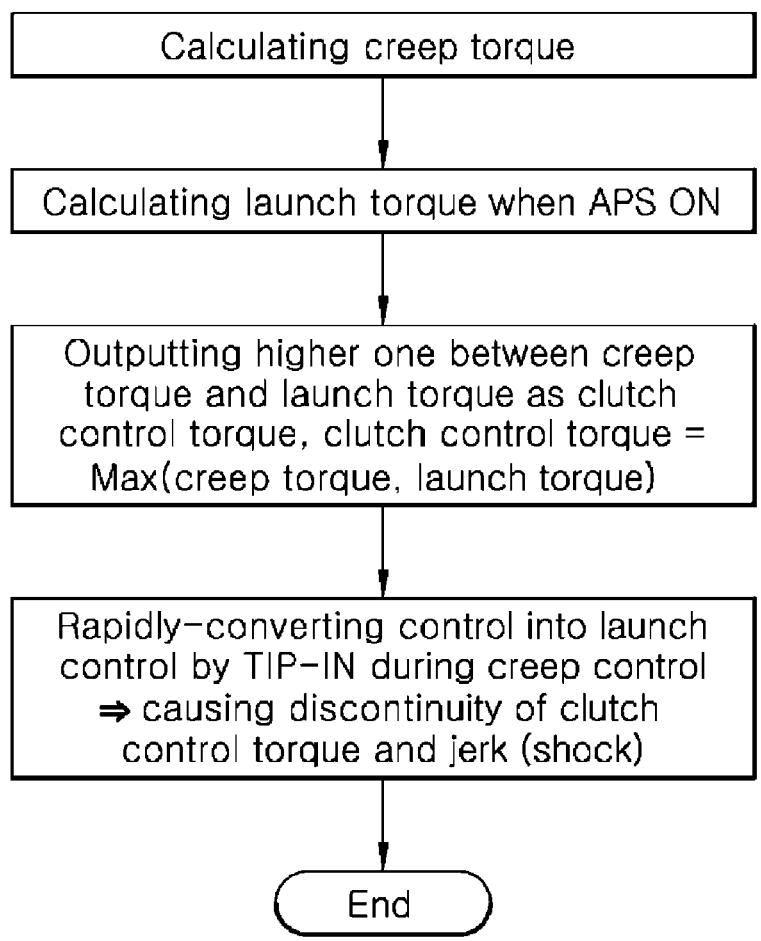
FIG. 1 is a flowchart of a method of controlling a clutch of a vehicle according to a conventional technique.
Figure 2:
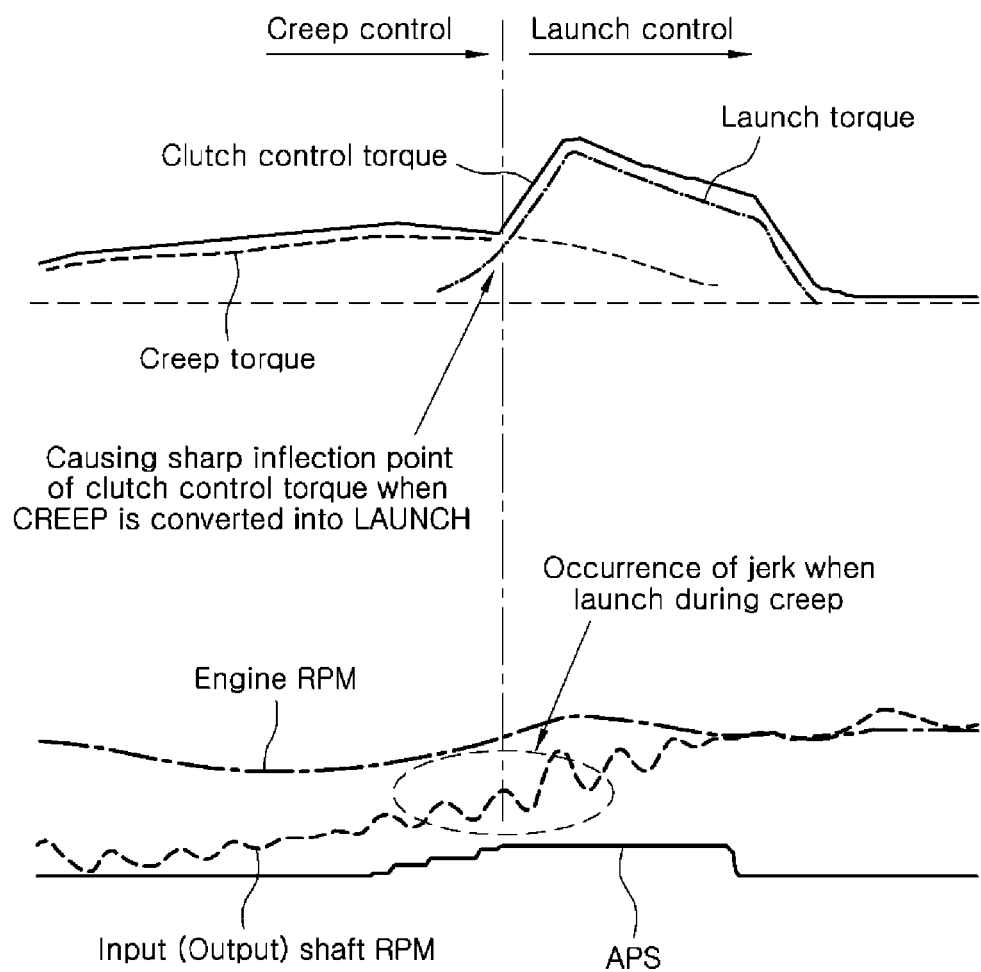
FIG. 2 is a graph of variations in a clutch control torque, the RPM of an engine and the RPM of an input shaft of a transmission in the conventional control method of FIG. 1.
Figure 3:
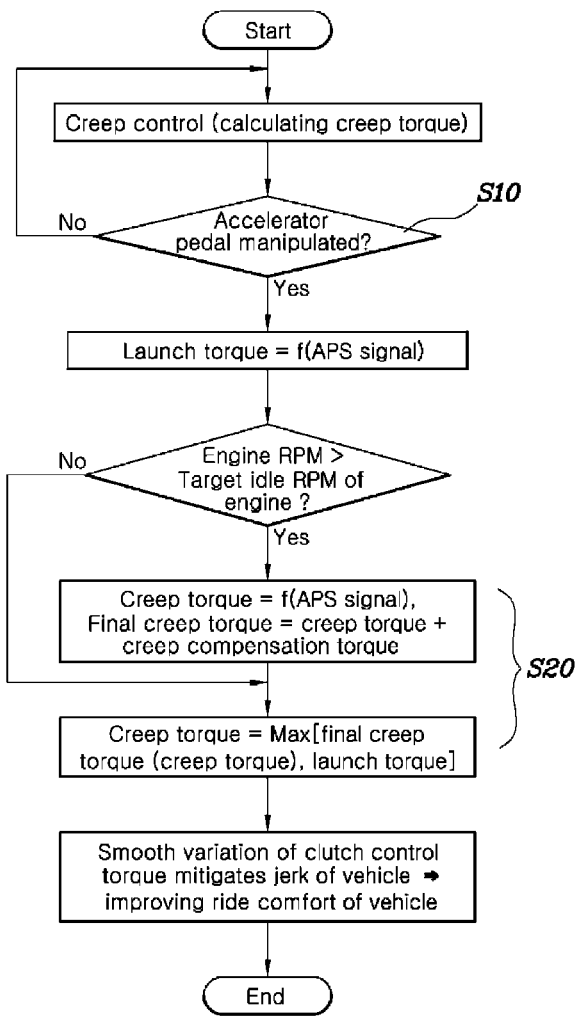
FIG. 3 is a flowchart of an exemplary method of controlling a clutch for a vehicle according to the present invention.
Figure 4:
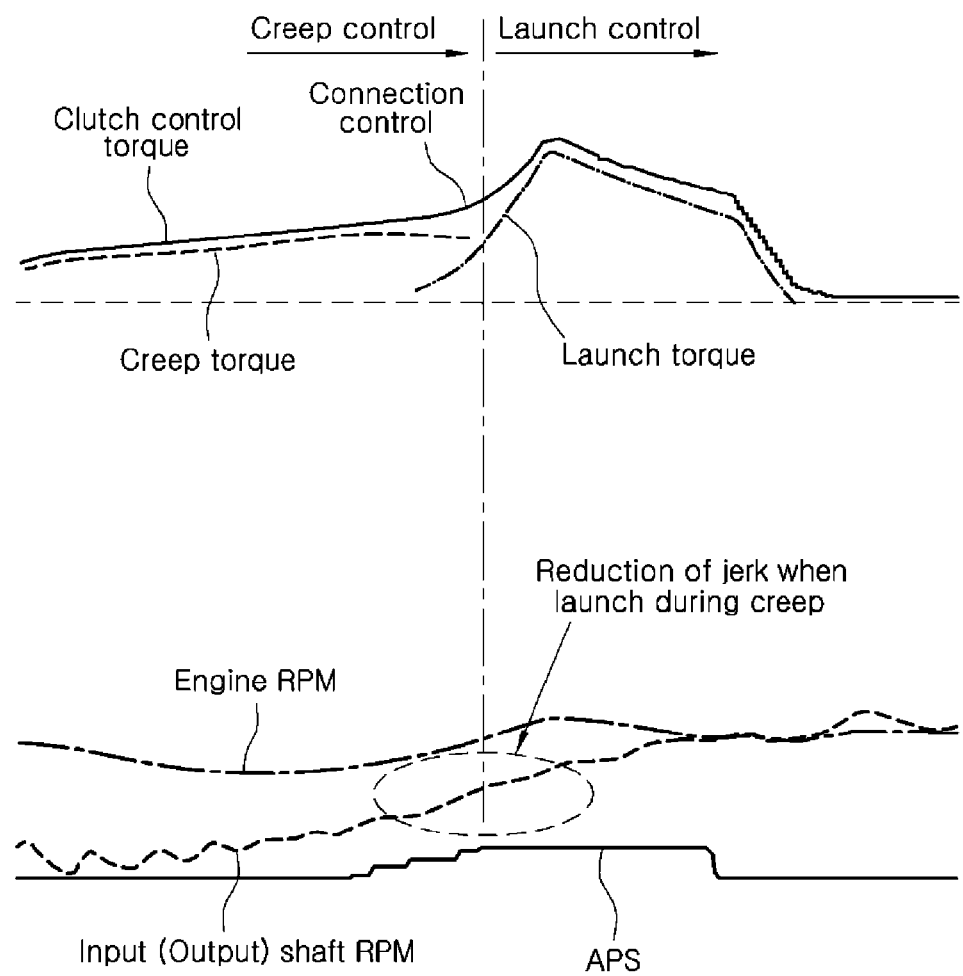
FIG. 4 is a graph of variations in an exemplary clutch control torque, the RPM of an engine and the RPM of an input shaft of a transmission in the control method of FIG. 3.

Referring to FIGS. 3 and 4, a method of controlling a clutch of a vehicle according to the present invention includes an accelerator-pedal-manipulation determining operation S10 of determining whether an accelerator pedal has been manipulated during creep control, and a connection control operation S20 of controlling a clutch control torque actually applied to the clutch such that if, from the result of the accelerator-pedal-manipulation determining operation S10, it is determined that the accelerator pedal has been manipulated during the creep control, when a launch torque, which is a clutch control torque calculated depending on a rate to which the accelerator pedal is manipulated, becomes greater than a creep torque which is a clutch control torque during the creep control, the clutch control torque gradually and continuously increases from the creep torque to the launch torque.

In other words, when the accelerator pedal is manipulated during the creep control so that the creep control is converted into the launch control, the connection control operation S20 is conducted between the creep control and the launch control, unlike the conventional technique in which the creep control is rapidly converted into the launch control without taking a separate measure. Therefore, the clutch control torque can smoothly vary, thus preventing rotational vibration of an input shaft of a transmission. This prevents the vehicle from jerking, thereby improving the ride comfort of the vehicle.

For reference, during the creep control, the clutch is slip-controlled such that there is a difference between the RPM of the engine and the RPM of the input shaft of the transmission. During the launch control, the clutch is controlled such that the RPM of the input shaft of the transmission is synchronized with the RPM of the engine.

In the connection control operation S20, the control of the clutch is converted from the creep control to the launch control in such a way that the creep torque gradually increases depending on the manipulation rate of the accelerator pedal that is input during the creep control.

In detail, the connection control operation S20 includes: adding a creep compensation torque depending on the manipulation rate of the accelerator pedal that is input during the creep control to the creep torque and determining a final creep torque; comparing the final creep torque with the launch torque calculated depending on the manipulation rate of the accelerator pedal; determining the final creep torque as the clutch control torque until the launch torque becomes greater than the final creep torque; and determining the launch torque as the clutch control torque after the launch torque is greater than the final creep torque.

To embody the above-stated control, if the controller controls the clutch in such a way that a higher value between the final creep torque and the launch torque calculated depending on the manipulation rate of the accelerator pedal is set as the clutch control torque, the clutch is consequently controlled in such a way that the final creep torque is set as the clutch control torque until the launch torque becomes greater than the final creep torque, and the launch torque is set as the clutch control torque after that.

Referring to FIG. 4, when the driver steps on the accelerator pedal during the creep control, an APS (accelerator pedal position sensor) signal is generated. At an initial stage, a launch torque that is calculated by the APS signal and used in the launch control is less than the creep torque. As time passes, the launch torque gradually increases and becomes larger than the creep torque. In the conventional technique, if the launch torque becomes larger than the creep torque, the clutch control torque is converted from the creep torque to the launch torque so that the creep control is rapidly converted into the launch control. However, in the present invention, the creep compensation torque is calculated depending on the manipulation rate of the accelerator pedal that is represented by the APS signal. The creep compensation torque is added to the creep torque, thus determining the final creep torque. Substantially, the creep torque gradually increases depending on the APS signal and is connected to the launch torque. As shown in FIG. 4, the clutch control torque is exhibited as a smooth curved line which is connected from the creep torque to the launch torque via the creep torque which increases depending on the APS signal.

As such, because the clutch control torque smoothly varies, the clutch is smoothly operated, thus preventing rotational vibration of the input shaft of the transmission. As a result, the vehicle can be prevented from jerking, so that the ride comfort of the vehicle can be improved.

The connection control operation S20 is conducted only when the current RPM of the engine is greater than a target idle RPM of the engine.

The reason for this is that it can prevent an event in which, if the creep compensation torque is added to the creep torque to calculate the clutch control torque when the current RPM of the engine is equal to or less than the target idle RPM of the engine, an excessive load is suddenly applied to the engine, thus making the operation of the engine unstable and causing a problem of the engine being stalled.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a clutch of a vehicle, comprising:
  an accelerator-pedal-manipulation determining operation of determining whether an accelerator pedal has been manipulated during a creep control; and
  a connection control operation of controlling a clutch control torque actually applied to the clutch by gradually and continuously increasing the clutch control torque from a creep torque to a launch torque, if it is determined in the accelerator-pedal-manipulation determining operation that the accelerator pedal was manipulated during the creep control;
  wherein the connection control operation comprises:
    determining a final creep torque by adding a creep compensation torque to the creep torque, wherein the creep compensation torque and the creep torque are determined depending on a manipulation rate of the accelerator pedal that is input during the creep control, comparing the final creep torque with the launch torque which is calculated depending on the manipulation rate of the accelerator pedal, and determining the clutch control torque to be the final creep torque if the final creep torque is greater than the launch torque or the launch torque if the launch torque is equal to or greater than the final creep torque.

2. The method as set forth in claim 1, wherein the connection control operation is conducted only when a current RPM of an engine is greater than a target idle RPM of the engine.

* * * * *